United States Patent

Castle et al.

[11] Patent Number: 5,604,991
[45] Date of Patent: Feb. 25, 1997

[54] SWITCHING AND PURGING MECHANISM FOR A TWIN TOWER AIR DRYER

[75] Inventors: T. Kevin Castle, Wellford; Michael V. Kazakis, Simpsonville, both of S.C.

[73] Assignee: Westinghouse Air Brake Company, Wilmerding, Pa.

[21] Appl. No.: 597,262

[22] Filed: Feb. 6, 1996

[51] Int. Cl.$^6$ ............................................. F26B 21/06
[52] U.S. Cl. ................................................... 34/80
[58] Field of Search ........................ 34/80; 137/625–667

[56] References Cited

U.S. PATENT DOCUMENTS

| | | | |
|---|---|---|---|
| 4,325,192 | 4/1982 | Larsen et al. | 34/80 |
| 4,559,065 | 12/1985 | Null et al. | 55/161 |
| 4,601,114 | 7/1986 | Noguchi | 34/27 |
| 4,656,757 | 4/1987 | Oschmann | 34/27 |
| 4,738,692 | 4/1988 | Fresch et al. | 55/26 |
| 4,858,335 | 8/1989 | Roth | 34/80 |
| 4,870,760 | 10/1989 | Gräff | 34/473 |
| 4,927,434 | 5/1990 | Cordes et al. | 55/20 |
| 5,485,686 | 1/1996 | Sears, Jr. | 34/473 |

*Primary Examiner*—Harold Joyce
*Assistant Examiner*—Dinnatia Doster
*Attorney, Agent, or Firm*—James Ray & Associates

[57] ABSTRACT

A switching and purging mechanism is disclosed for controlling flow of gas within a twin tower gas drying system. The drying system filters unpurified gas to supply purified gas to a pneumatic system with a purge percentage for purging moisture previously retained. The mechanism includes a valve body, first and second pistons, and a control means. The body defines first and second bores, first and second supply passages, first and second output ports, and first and second purge ports. Through the control means, the first piston occupies a supply position while the second piston occupies a purge position and vice versa. When the first piston occupies the supply position, unpurified gas flows from the first passage through the first bore through the first output port and communication between the first output port and the first purge port ceases. When the first piston occupies the purge position, remoisturized gas flows from the first output port through the first bore through the first purge port and communication between the first passage and the first output port ceases. When the second piston occupies the supply position, unpurified gas flows from the second passage through the second bore through the second output port and communication between the second output port and the second purge port ceases. When the second piston occupies the purge position, remoisturized gas flows from the second output port through the second bore to the second purge port and communication between the second passage and the second output port ceases.

17 Claims, 5 Drawing Sheets

SWITCHING AND PURGING MECHANISM FOR A TWIN TOWER AIR DRYER

CROSS-REFERENCE TO RELATED APPLICATIONS

This application is related to copending applications Ser. Nos. 08/597,261 and 08/597,076 both sharing the same filing date of the present application, Feb. 6, 1996, and filed currently herewith. These patent applications are assigned to the assignee of the present invention, and the teachings therein are incorporated into the present application by reference thereto.

FIELD OF THE INVENTION

The present invention generally relates to a system for drying air supplied by a compressor unit for use in a pneumatic system. More particularly, the present invention pertains to a switching and purging mechanism for controlling flow of air within a twin tower air drying system having two drying assemblies. The twin tower air drying system cleans and dries a stream of unpurified pressurized air and supplies the purified air to a pneumatic system with a purge percentage of the purified air for purging alternately from each drying assembly moisture previously retained via remoisturization of the purified air and expulsion of same of atmosphere.

BACKGROUND OF THE INVENTION

Air drying systems are well known and practiced in a variety of technical fields. One such prior art air drying system is a single tower system illustrated in FIG. 1 of U.S. Pat. No. 5,423,129. Shown herein as prior art FIG. 1, the prior art single tower air drying system is designed to provide clean and dry compressed air to a pneumatic system such as a brake system of a railroad train. The prior art system accomplishes this by removing moisture and airborne particulates from a stream of compressed air as it passes through a desiccant material contained within the single tower.

FIG. 1 illustrates a cross-sectional view of the prior art system. From right to left FIG. 1 shows an opening through which unpurified compressed air is received; a sump volume; the single tower housing the desiccant material; a purge check valve with a choke; a side chamber connected to a purge volume; a discharge air filter element; a discharge check valve; and an output chamber through which purified compressed air passes eventually to the pneumatic system.

In operation, the prior art air drying system receives from an air compressor (not shown) a supply of air which typically contains an unacceptably high amount of moisture and other particulates suspended therein. This unpurified compressed air passes into the sump volume and then flows upwardly eventually reaching the desiccant material. The desiccant plays the key role within the single tower air drying system in that it absorbs the moisture and traps various particulates (e.g., dust, dirt, etc.) as the compressed air moves radially into and through the desiccant material. Once moisture and particulates are extracted from the air stream, the cleaned and dried compressed air continues flowing from the center of the desiccant material through the purge check valve situated near the top of the single tower. This purified compressed air then passes through the side chamber eventually reaching the purge volume identified by reference numeral 5 in FIG. 1.

The purge volume of the prior art air drying system is capable of holding approximately five-hundred cubic inches (500 in$^3$) of purified compressed air. When the air compressor is cycled off, the single tower system operates in a purge mode. During the purge mode, the purified pressurized air contained within the purge volume passes slowly in the reverse direction through the choke in the purge check valve and then back through the desiccant material. This slow stream of dried air reabsorbs a portion of the moisture previously collected within the desiccant material. Having evaporated in this passing stream of dry air, the evaporated moisture eventually exhausts through the sump volume to atmosphere. This gradual purging of dry air back through the system serves to dry out and thus rejuvenate the desiccant material. When the air compressor is again cycled on, the single tower system operates in a drying mode. During the drying mode, the desiccant material then again removes moisture from the stream of unpurified compressed air passing therethrough.

There are, however, several disadvantages inherent to the prior art drying system. Perhaps the most apparent disadvantage is that the source of unpurified compressed air must be cycled off in order to purge the desiccant material of the moisture it has accumulated. This serves to deprive temporarily the pneumatic system of a steady supply of clean and dried compressed air while the compressor is turned off. This shortcoming can prove quite inconvenient in certain applications.

Another disadvantage of the single tower air drying system is that it is only capable of removing a certain amount of moisture during the purge mode. Because the volume of unpurified air flowing into the prior art system vastly exceeds the volume of purified air used to purge the desiccant material, the desiccant material never adequately exsiccates during operation of the single tower system. Apparently, the desiccant material adequately exsiccates only after the prior art system has been turned off for a time sufficient to accomplish same.

The present document, however, discloses a switching and purging mechanism for a twin tower air drying system that overcomes the disadvantages of the prior art single tower system. First, the twin tower system need not cycle off the source of unpurified air to purge the air drying system of accumulated moisture. The prior art system, however, does. Second, the twin tower system more efficiently exsiccates the air stream than does the prior art single tower system.

Regarding the first advantage, the twin tower system continuously supplies purified air to the pneumatic system to which it is attached. Specifically, while one drying assembly of the twin tower system operates in the drying mode and therein supplies dry air to the pneumatic system, the other drying assembly operates in the purge mode and is therein purged of moisture it previously accumulated. After a predetermined time, the twin tower system switches the latter drying assembly to the drying mode and the former drying assembly to the purge mode. This switching continues until the source of pressurized air ceases supplying unpurified air to the twin tower system. Unlike the prior art system, the instant system need not deprive the pneumatic system of a steady supply of clean and dried compressed air while purging itself of moisture.

Regarding the second advantage, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

The foregoing background information is provided to assist the reader in understanding the instant invention and any terms of art used herein are not intended to be limited to any specific meaning unless specifically stated otherwise in this specification including the following detailed description.

SUMMARY OF THE INVENTION

In a presently preferred embodiment, the present invention provides a switching and purging mechanism for controlling flow of air within a twin tower air drying system having two drying assemblies. The twin tower system cleans and dries a stream of unpurified pressurized air received from a source thereof and supplies the purified air to a pneumatic system. The twin tower system uses a purge percentage of the purified air for purging alternately from each such drying assembly moisture previously retained via remoisturization of such purified air. The switching and purging mechanism includes a valve body and two piston valves. The valve body defines a first and a second piston bore, a first and a second supply passage, a first and a second output port, and a first and a second purge port. The first and second piston valves move within the first and second piston bores, respectively, such that the first piston valve occupies a supply position while the second piston valve occupies a purge position and vice versa. When the first piston valve occupies the supply position, unpurified air flows from the first supply passage through the first piston bore through the first output port and communication between the first output port and the first purge port ceases. When the first piston valve occupies the purge position, remoisturized air flows from the first output port through the first piston bore through the first purge port and communication between the first supply passage and the first output port ceases. When the second piston valve occupies the supply position, unpurified air flows from the second supply passage through the second piston bore through the second output port and communication between the second output port and the second purge port ceases. When the second piston valve occupies the purge position, remoisturized air flows from the second output port through the second piston bore through the second purge port and communication between the second supply passage and the second output port ceases.

In a second embodiment, the present invention provides a dual valve mechanism for controlling flow of four streams of fluid within a suitable system. The dual valve mechanism includes a valve body and two piston valves. The valve body defines a first and a second piston bore, a first and a second supply passage, a third and a fourth supply passage, and a first and a second output port. The first and second piston valves move within the first and second piston bores, respectively, such that each can occupy a primary flow position and a secondary flow position. The first supply passage receives a first stream of fluid. The second supply passage receives a second stream of fluid. The third supply passage receives a third stream of fluid and fourth supply passage receives a fourth stream of fluid. When the first piston valve seats against a first lower valve seat, the first piston valve occupies a primary flow position in which the first stream of fluid flows from the first supply passage through first piston bore through first output port. Communication between the third supply passage and the first output port ceases. When the first piston valve seats against a first upper valve seat, the first piston valve occupies a secondary flow position in which the third stream of fluid flows from the third supply passage through first piston bore through first output port. Communication between the first supply passage and the first output port ceases. Likewise, when the second piston valve seats against a second lower valve seat, the second piston valve occupies a primary flow position in which the second stream of fluid flows from the second supply passage through the second piston bore through the second output port. Communication between the fourth supply passage and the second output port ceases. When the second piston valve seats against a second upper valve seat, the second piston valve occupies a secondary flow position in which the fourth stream of fluid flows from the fourth supply passage through the second piston bore through the second output port. Communication between the second supply passage and the second output port ceases. The valve control means of the dual valve mechanism switches the first and second piston valves periodically between the primary and secondary flow positions.

OBJECTS OF THE INVENTION

It is, therefore, a primary object of the present invention to provide a switching and purging mechanism for controlling flow of air within a twin tower air drying system having two drying assemblies. The twin tower air drying system cleans and dries a stream of unpurified pressurized air received from a source thereof and supplies the purified air to a pneumatic system with a purge percentage of the purified air for purging alternately from each drying assembly moisture previously retained via remoisturization of the purified air and expulsion of same to atmosphere.

Another object of the present invention is to provide a dual valve mechanism for controlling flow of four streams of fluid within a suitable system.

In addition to the objects and advantages of the present invention set forth above, various other objects and advantages will become more readily apparent to those persons skilled in the gas drying system art from the detailed description of the invention, particularly, when considered in conjunction with the attached drawings and with the appended claims.

DETAILED DESCRIPTION OF THE INVENTION

Figure 1:
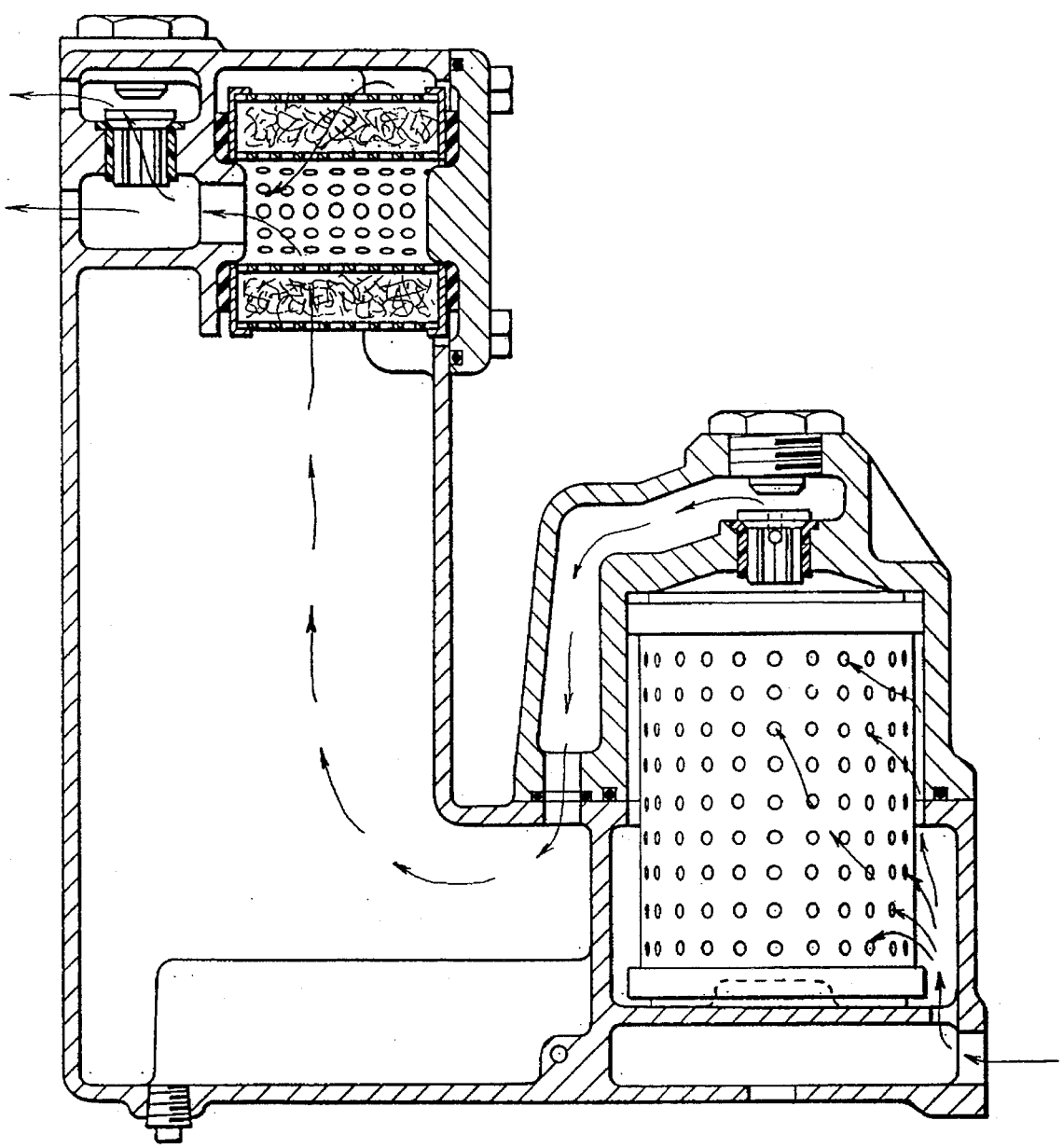
FIG. 1 is a cross-sectional view of a prior art single tower air drying system as illustrated in U.S. Pat. No. 5,423,129.

Before describing the present invention in detail, for the sake of clarity and understanding, the reader is advised that identical components having identical functions in each of the accompanying drawings have been marked with same reference numerals throughout each of the several Figures illustrated herein.

Figure 2:
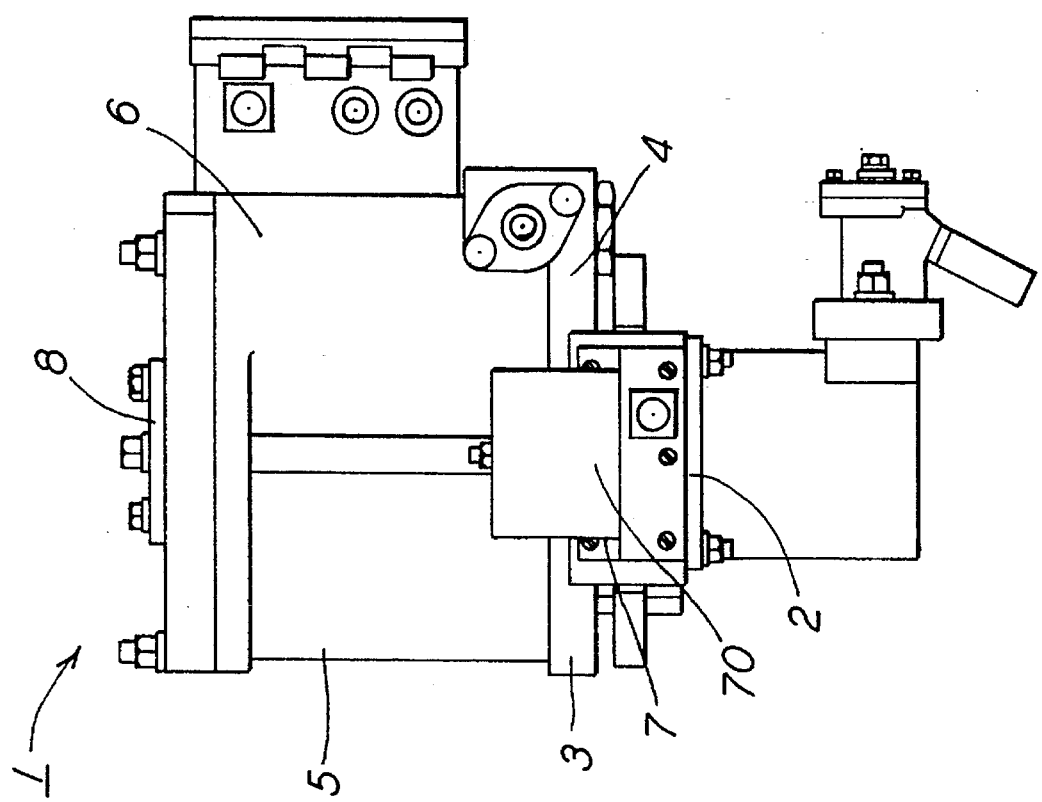
FIG. 2 is a schematic diagram of a twin tower air drying system illustrating a side dimensional view thereof including a separating device, a switching and purging mechanism, two drying assemblies and a check valve mechanism.
Figure 3:
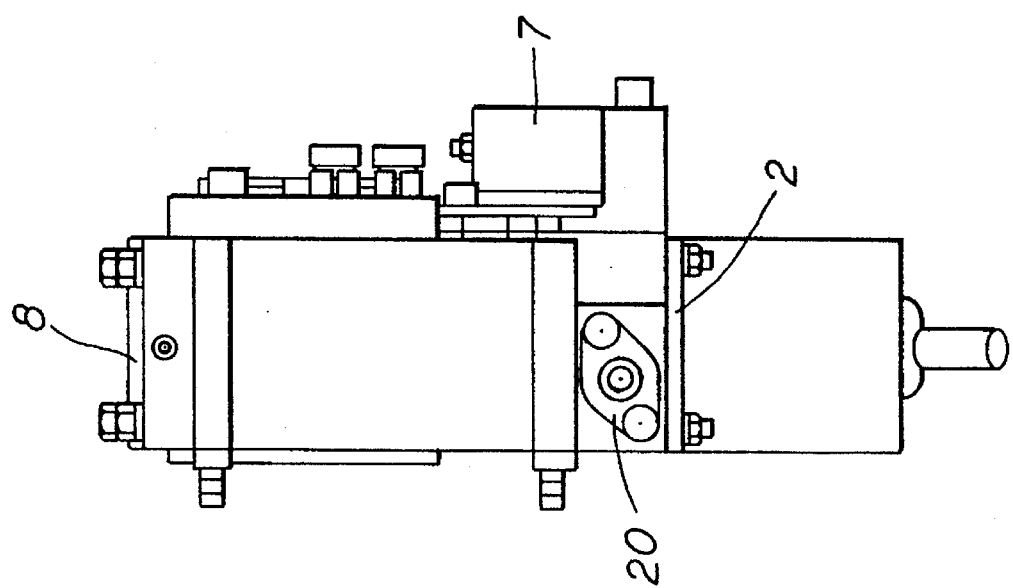
FIG. 3 is a schematic diagram of the twin tower air drying system illustrating another side dimensional view thereof including a separating device, a switching and purging mechanism, two drying assemblies and a check valve mechanism.

FIGS. 2 and 3 illustrate the essential details of a twin tower air drying system, generally designated 1. The twin tower system 1 cleans and dries a stream of unpurified pressurized air received from a source of compressed air so as to supply a pneumatic system with purified air. The unpurified air to be filtered will typically contain the vapor of various substances as well as moisture in the form of water or other liquids such as various oils. For the sake of brevity, the terms vapor and moisture are herein collectively referred to as "moisture." The unpurified air will also typically contain other particulates such as dirt, dust, pollen and various other contaminants.

Referring first to FIGS. 2 and 3, the twin tower air drying system 1 includes a separating means 2, two coalescing elements 3 and 4, two towers 5 and 6 each having desiccant material therein, a switching and purging means 7 and a check valve means 8. Described summarily, the twin tower system 1 cleans and dries unpurified air received from a source of pressurized air (not shown) to supply purified air to a pneumatic system (not shown). Through the function of the switching and purging means 7, the purified air is supplied alternately from each of the desiccant towers 5 and 6 through the check valve means 8 for distribution in an output percentage to the pneumatic system and in a purge percentage back into the twin tower system 1. The purge percentage of the cleaned and dried air is used to purge the twin tower system 1 of moisture it has previously collected.

The separating means 2 of the twin tower system 1 receives a stream of unpurified pressurized air from a compressor unit through a compressed air inlet 20. The separating means 2 serves as a first step in separating moisture and other particulates from the stream of unpurified air as the unpurified air passes therethrough. The separating means 2 includes a chamber and a sump. The chamber directs the unpurified air to flow generally counterclockwise within the chamber. This causes the heavier moisture and other particulates suspended therein to impact the interior walls of the chamber and fall into the sump. During continuous operation of the twin tower system 1, the moisture and other particulates centrifugally separated from the stream of unpurified air accumulate within the sump. Periodically and at any time the compressor cycles off, the twin tower system 1 opens a drain valve through which the collected fluid and particulates are forcefully expelled to atmosphere via pressure then contained within the twin tower system 1.

Through the switching and purging means 7, the separating means 2 supplies each of the coalescing elements 3 and 4 with the initially filtered stream of unpurified air. A first of the coalescing elements 3 connects to a first of the desiccant towers 5 and taken together or individually can be referred to as a first drying assembly. A second of the coalescing elements 4 connects to a second of the desiccant towers 6 and likewise can be referred to as a second drying assembly. Through the switching and purging means 7 as described in greater detail hereinafter, the first coalescing element 3 and the first desiccant tower 5 function on an alternating basis with the second coalescing element 4 and the second desiccant tower 6. The first coalescing element 3 further removes moisture contained within the initially filtered stream of unpurified air received from the separating means 2. The initially filtered stream is then passed through the first desiccant tower 5 wherein any moisture including vapor remaining therein is absorbed by the desiccant. Likewise, the second coalescing element 4 further removes moisture contained within the initially filtered stream of unpurified air received from the separating means 2. The initially filtered stream is then passed through the second desiccant tower 6 wherein any moisture including vapor remaining therein is absorbed by the desiccant. Flowing from the first desiccant tower 5 is cleaned and dried air referred to herein as a first stream of purified air. Flowing from the second desiccant tower 6 is cleaned and dried air referred to herein as a second stream of purified air. The first and second streams of purified air, however, flow on an alternating basis as controlled by the switching and purging means 7.

Figure 4:
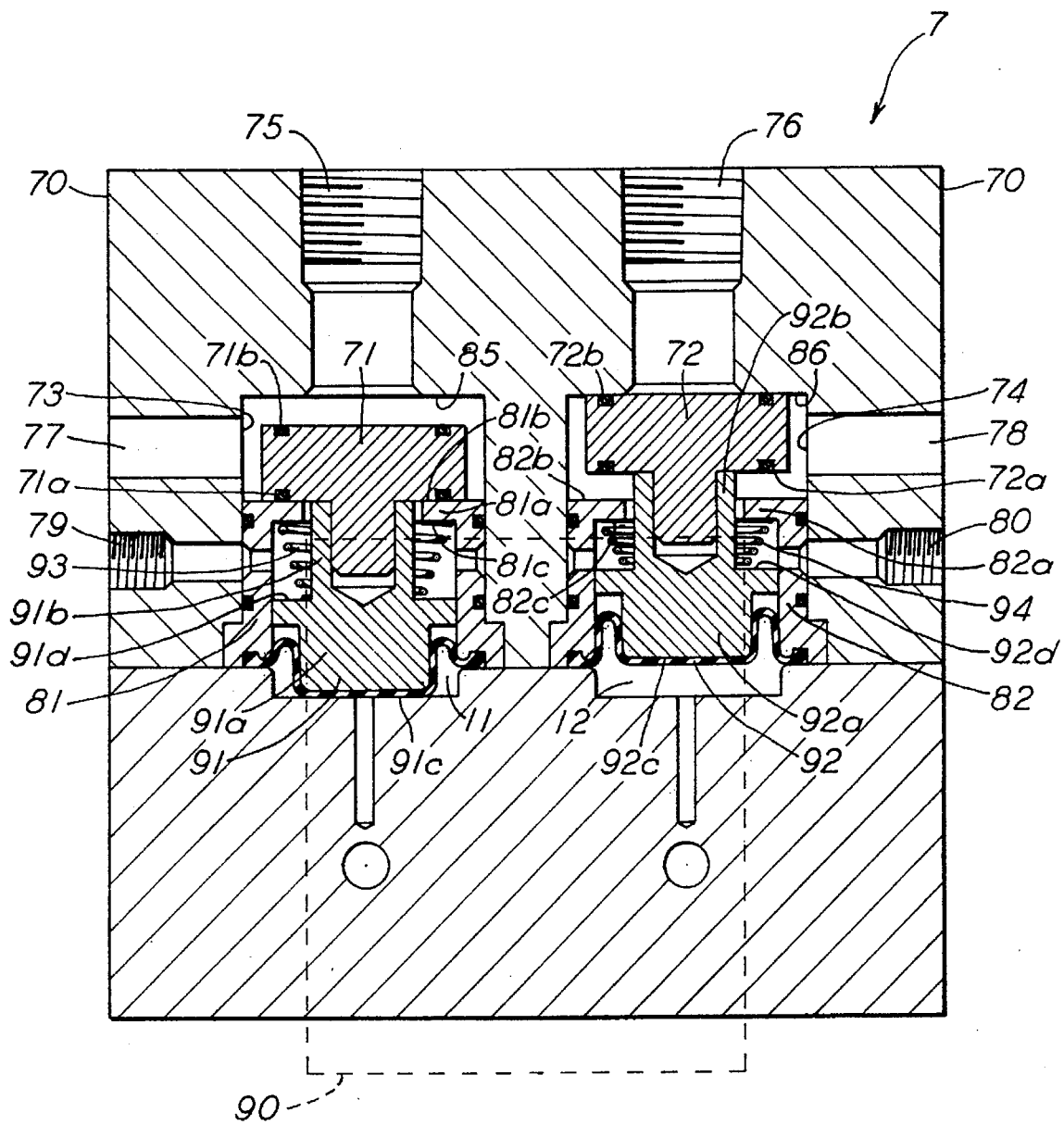
FIG. 4 is a cross-sectional schematic view of a switching and purging mechanism for the twin tower air drying system illustrating a first piston valve device (on the left) in a supply position and a second piston valve device in a purge position.

FIG. 4 illustrates the essential details of the switching and purging means 7 of the twin tower air drying system 1. The switching and purging means 7 includes a valve body 70, first and second valve stems 71 and 72, first and second valve cups 81 and 82, and a valve stem control means 90 (shown in part). The valve body 70 defines first and second piston bores 73 and 74, first and second supply passages 75 and 76, first and second output ports 77 and 78, and first and second purge ports 79 and 80. Each of the supply passages 75 and 76 connect to the source of unpurified pressurized air. The first and second valve cups 81 and 82 are concentrically disposed and affixed within the first and second piston bores 73 and 74, respectively. Together with first and second valve stems 71 and 72, valve cups 81 and 82 can be included within a piston valve means.

Piston bores 73 and 74, supply passages 75 and 76, output ports 77 and 78 and purge ports 79 and 80 relate structurally as follows. First supply passage 75 is communicable with first output port 77 through first piston bore 73, and second supply passage 76 is communicable with second output port 78 through second piston bore 74. First purge port 79 is communicable with first output port 77 through first piston bore 73, and second purge port 80 is communicable with second output port 78 through second piston bore 74.

Referring still to FIG. 4, the valve stem control means 90 of the switching and purging means 7 includes first and second diaphragm piston members 91 and 92, first and second biasing springs 93 and 94, first and second solenoid valves (not shown) and a pneumatic controller unit (not shown). The first and second diaphragm members 91 and 92 attach to the first and second valve stems 71 and 72, respectively. The first and second biasing springs 93 and 94 serve to bias first and second valve stems 71 and 72, respectively, as described below. Through the exhaust and supply valves (not shown) of the first and second solenoid valves, the pneumatic controller unit supplies pressure to and exhausts pressure from chambers 11 and 12. Diaphragm piston members 91 and 92 rise and fall accordingly thereby alternately moving first and second valve stems 71 and 72 periodically between a supply position and a purge position. Diaphragm members 91 and 92, springs 93 and 94, the solenoid valves and the pneumatic controller can be included within a piston control means.

The first and second springs 93 and 94 of the switching and purging means 7 serve to bias the first and second valve stems 71 and 72. Each of the diaphragm piston members 91,92 has a base portion 91a, 92a and a symmetrically narrowed section 91b, 92b arising therefrom for affixation to its respective valve stem 71,72. Each base portion 91a, 92a has a bottom surface 91c, 92c and an annular top surface 91d, 92d. Each of the valve cups 81, 82 has an annular portion 81a, 82a having an upper surface 81b, 82b as a lower valve seat and an annular lower surface 81c, 82c. The first biasing spring 93 sits compressed between the annular lower surface 81c of the first valve cup 81 and the annular top surface 91d of the base portion 91a of the first diaphragm piston member 91. Likewise, the second biasing spring 94 sits compressed between the annular lower surface 82c of the second valve cup 82 and the annular top surface 92d of the base portion 92a of the second diaphragm piston member 92. When the pneumatic controller unit of the valve stem control means 90 is turned off, the first and second biasing springs 93 and 94 hold the first and second valve stems 71 and 72, respectively, in the supply position.

It is, therefore, through the pneumatic controller unit of the switching and purging means 7 that first and second valve stems 71 and 72 each occupy alternatingly for a predetermined amount of time the supply and purge positions. Simply stated, when the first valve stem 71 occupies the supply position, the second valve stem 72 occupies the purge position and vice versa. Specifically, when the first valve stem 71 occupies the supply position, the first valve stem 71 seats against lower valve seat 81b of first valve cup 81. The first supply passage 75 and the first output port 77 communicate through first piston bore 73 while the first output port 77 and the first purge port 79 are isolated from one another. Simultaneously, the second valve stem 72 occupies the purge position in which the second valve stem 72 seats against an upper valve seat 86 of valve body 70. The second output port 78 and the second purge port 80 communicate through second piston bore 74 while the second supply passage 76 and the second output port 78 are isolated from one another.

Conversely, the first valve stem 71 occupies the purge position while the second valve stem 72 occupies the supply position. Specifically, when the first valve stem 71 occupies the purge position, the first valve stem 71 seats against an upper valve seat 85 of valve body 70. The first output port 77 and the first purge port 79 communicate through first piston bore 73 while the first supply passage 75 and the first output port 77 are isolated from one another. Simultaneously, the second valve stem 72 occupies the supply position in which the second valve stem 72 seats against lower valve seat 82b of second valve cup 82. The second supply passage 76 and the second output port 78 communicate through second piston bore 74 while the second output port 78 and the second purge port 80 are isolated from one another.

The switching and purging means 7 thus controls the direction of flow of the stream of unpurified air received from the separating means 2. By directing the flow of the stream of unpurified air through the twin tower system 1, the switching and purging means 7 also ultimately controls the flow of the first and second streams of purified gas from the desiccant towers 5 and 6 through the check valve means 8. Through the check valve means 8, purified gas from either the first or second streams flows to the pneumatic system in the output percentage and back into the twin tower system 1 in the purge percentage to purge moisture previously collected.

Figure 5C:
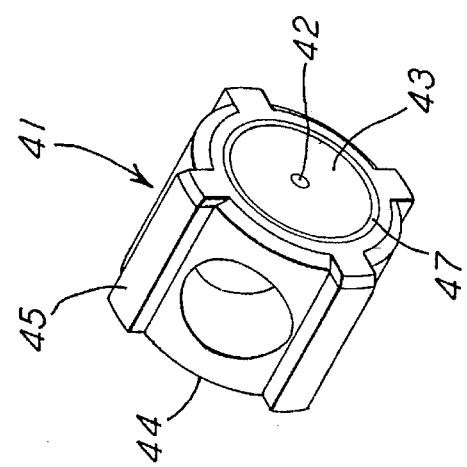
FIG. 5c is a perspective view of a shuttle choke device of the check valve mechanism illustrating a bearing surface and a purge orifice defined by the device.
Figure 5A:
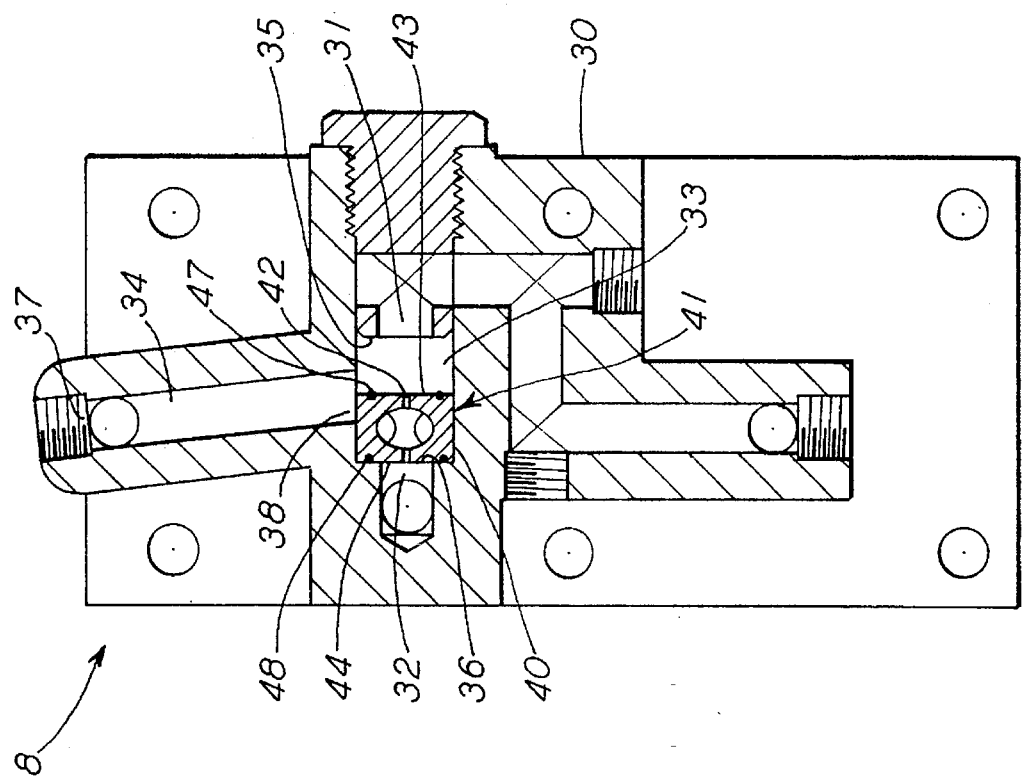
FIG. 5a is a cross-sectional schematic view of a check valve mechanism for the twin tower air drying system illustrating operation of the check valve mechanism when the first piston valve occupies the supply position and the second piston valve occupies the purge position.
Figure 5B:
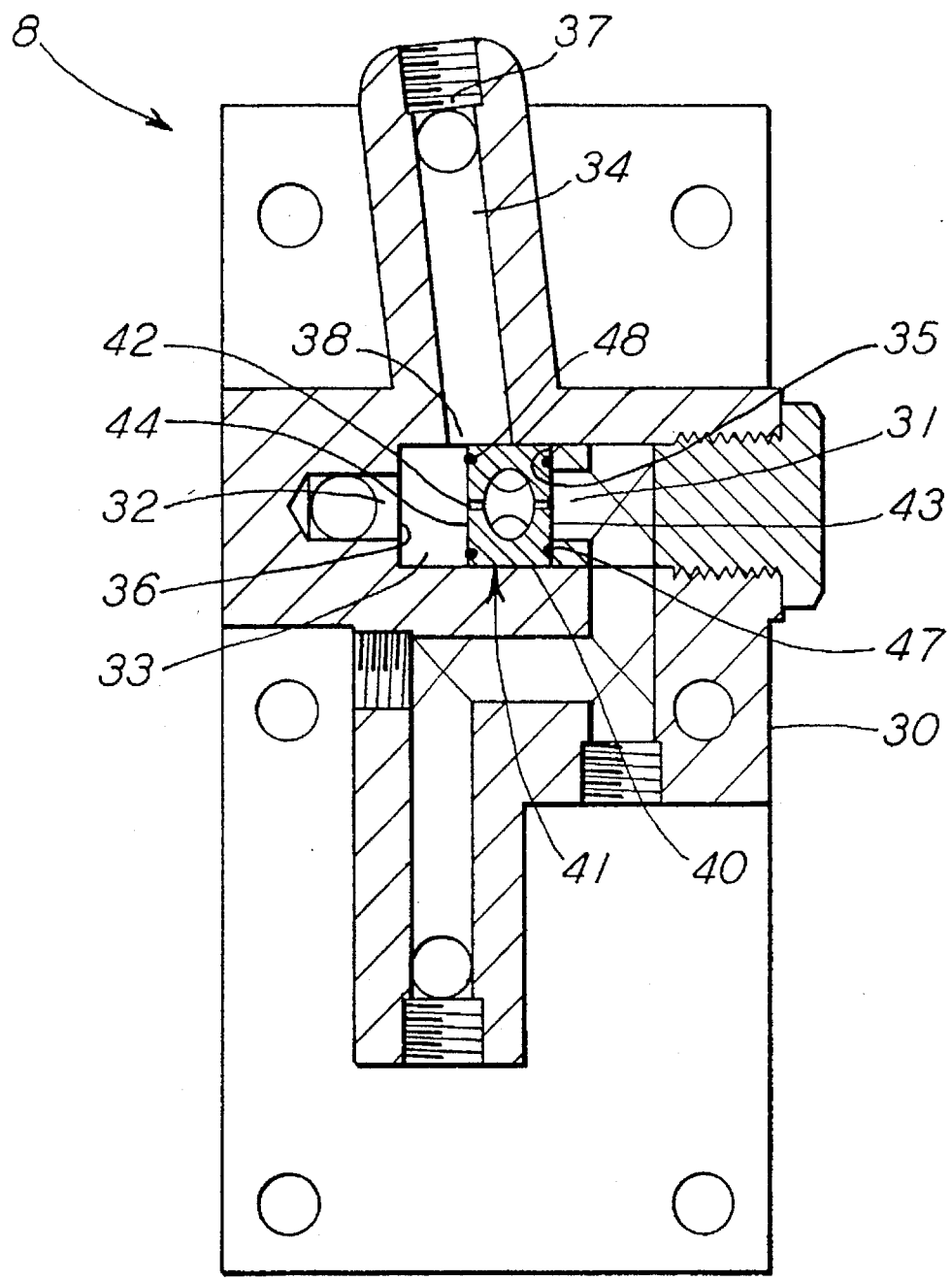
FIG. 5b is a cross-sectional schematic view of the check valve mechanism illustrating operation of the check valve mechanism when the second piston valve occupies the supply position and the first piston valve occupies the purge position.

FIGS. 5a, 5b and 5c illustrate the essential details of the check valve means 8 of the twin tower air drying system 1. The check valve means 8 includes a check valve body 30 and a shuttle choke means 40. The check valve body 30 defines a first channel 31 connected to the first desiccant tower 5, a second channel 32 connected to the second desiccant tower 6, a shuttle tube 33 having a first end 35 connected to the first channel 31 and a second end 36 connected to the second channel 32. The check valve body 30 also defines an output passage 34 having an initial end 37 communicating with the pneumatic system and a terminal end 38 communicable with shuttle tube 33. As shown in FIG. 5c, the shuttle choke means 40 includes a shuttle choke 41 for sliding between the ends 35 and 36 of shuttle tube 33, a first o-ring 47 and a second o-ring 48. The shuttle choke 41 defines a purge orifice 42 therethrough and has a first end 43, a second end 44 and a bearing surface 45. The bearing surface 45 controls rotation and axial movement of shuttle choke 41 as shuttle choke 41 slides between the first and second ends 35 and 36 of shuttle tube 33.

Referring now to FIGS. 2 through 5 for purposes of describing the operation of the instant switching and purging mechanism as well as the twin tower system 1 overall, the operation of the twin tower system 1 essentially has two phases. The pneumatic controller unit of the switching and purging means 7 ultimately controls automatically the cycling of the twin tower system 1 between these two phases of operation. In a first phase, valve stem 71 occupies the supply position while valve stem 72 occupies the purge position. For a predetermined amount of time, the pneumatic controller unit maintains valve stems 71 and 72 in their respective positions within piston bores 73 and 74. First and second valve stems 71 and 72 are then switched to the purge and supply positions, respectively. In this second phase, the pneumatic controller unit likewise maintains valve stems 71 and 72 in their respective positions within piston bores 73 and 74 for the predetermined amount of time. The pneumatic controller unit thus moves valve stems 71 and 72 back and forth between the supply and purge positions on an alternating basis.

FIG. 4 illustrates operation of the twin tower system 1 in the first phase of operation. First valve stem 71 occupies the supply position while second valve stem 72 occupies the purge position. The pneumatic controller achieves this first operational phase by simultaneously exhausting pressure from chamber 11 through the first solenoid valve and supplying pressure to chamber 12 through the second solenoid valve as shown in FIG. 4. Regarding first valve stem 71, the lack of pressure within chamber 11 allows the bias of spring 93 to force diaphragm piston member 91 and valve stem 71 attached thereto downwardly. Valve stem 71 seats against lower valve seat 81b of valve cup 81 thereby placing valve stem 71 in the supply position. A first lower valve seat o-ring 71a serves as a seal therebetween. Due to the seal between valve stem 71 and lower valve seat 81b, first output port 77 and first purge port 79 are cut off from each other. Regarding second valve stem 72, the build-up of pressure within chamber 12 overcomes the bias of spring 94 to force diaphragm piston member 91 and valve stem 71 attached thereto upwardly. Valve stem 72 seats against upper valve seat 86 of valve body 70 thereby placing valve stem 72 in the purge position. A second upper valve seat o-ring 72b serves as a seal therebetween. Due to the seal between valve stem 72 and upper valve seat 86, second supply passage 76 and second output port 78 are cut off from each other.

While in this first operating phase, the initially filtered stream of unpurified air received from separating means 2 flows into first supply passage 75 through first piston bore 73 through first output port 77 to first coalescing element 3. First coalescing element 3 further removes moisture contained within the initially filtered stream of unpurified air. The initially filtered stream then passes through the first desiccant tower 5. From first desiccant tower 5 flows the first stream of purified air. Having been stripped of vapor and nearly all other moisture remaining within the initially filtered stream, the first stream of purified air has a very low dewpoint temperature. From first desiccant tower 5, the first stream then flows into the first channel 31 of check valve means 8 of FIG. 5a. The first stream of purified air continues flowing from first channel 31 into shuttle tube 33. Due to the force of the first stream, shuttle choke 41 slides to the left within shuttle tube 33 and forcibly seals against the second end 36 of shuttle tube 33 courtesy of second o-ring 48. Shuttle choke 41 thus channels the first stream of purified air within check valve means 8. The output percentage of the first stream flows through output passage 34 to the pneumatic system. Simultaneously, the purge percentage of the first stream flows through the purge orifice 42 of the shuttle choke 41 into the second channel 32 of check valve means 8. The purge percentage of the first stream continues flowing through the second channel 32 into second desiccant tower 6 and then into the second coalescing element 4. Due to the very low dewpoint temperature of the air, vapor and other moisture previously retained within the second desiccant tower 6 and the second coalescing element 4 are reabsorbed by the purge percentage of the first stream of purified air passing therethrough. The now remoisturized air passes from the second coalescing element 4 through the second output port 78 through the second piston bore 74 to atmosphere via second purge port 80. First and second valve stems 71 and 72 remain in the supply and purge positions, respectively, (i.e., the first phase of operation continues) until the pneumatic controller unit switches to the second phase of operation after the predetermined amount of time.

The operation of the twin tower system 1 in the second phase of operation mirrors that of the first phase of operation. Though not illustrated herein, second valve stem 72 occupies the supply position while first valve stem 71 occupies the purge position. The pneumatic controller achieves this second operational phase by simultaneously exhausting pressure from chamber 12 through the second solenoid valve and supplying pressure to chamber 11 through the first solenoid valve. Regarding second valve stem 72, the lack of pressure within chamber 12 allows the bias of spring 94 to force diaphragm piston member 92 and valve stem 72 attached thereto downwardly. Valve stem 72 seats against lower valve seat 82b of valve cup 82 thereby placing valve stem 72 in the supply position. A second lower valve seat o-ring 72a serves as a seal therebetween. Due to the seal between valve stem 72 and lower valve seat 82b, second output port 78 and second purge port 80 are cut off from each other. Regarding first valve stem 71, the build-up of pressure within chamber 11 overcomes the bias of spring 93 to force diaphragm piston member 91 and valve stem 71 attached thereto upwardly. Valve stem 71 seats against upper valve seat 85 of valve body 70 thereby placing valve stem 71 in the purge position. A first upper valve seat o-ring 71b serves as a seal therebetween. Due to the seal between valve stem 71 and upper valve seat 85, first supply passage 75 and first output port 77 are cut off from each other.

While in this second operating phase, the initially filtered stream of unpurified air received from separating means 2 flows into second supply passage 76 through second piston bore 74 through second output port 78 to second coalescing element 4. Second coalescing element 4 further removes moisture contained within the initially filtered stream of unpurified air. The initially filtered stream then passes through the second desiccant tower 6. From second desiccant tower 6 flows the second stream of purified air. Having been stripped of vapor and nearly all other moisture remaining within the initially filtered stream, the second stream of purified air has a very low dewpoint temperature. From second desiccant tower 6, the second stream then flows into the second channel 32 of check valve means 8 of FIG. 5b. The second stream of purified air continues flowing from second channel 32 into shuttle tube 33. Due to the force of the second stream, shuttle choke 41 slides to the right within shuttle tube 33 and forcibly seals against the first end 35 of shuttle tube 33 courtesy of first o-ring 47. Shuttle choke 41 then channels the second stream of purified air within check valve means 8. The output percentage of the second stream flows through output passage 34 to the pneumatic system. Simultaneously, the purge percentage of the second stream flows through the purge orifice 42 of the shuttle choke 41 into the first channel 31 of check valve means 8. The purge percentage of the second stream continues flowing through the first channel 31 into first desiccant tower 5 and then into the first coalescing element 3. Due to the very low dewpoint temperature of the air, vapor and other moisture previously retained within the first desiccant tower 5 and the first coalescing element 3 are reabsorbed by the purge percentage of the second stream of purified air passing therethrough. The now remoisturized air passes from the first coalescing element 3 through the first output port 77 through the first piston bore 73 to atmosphere via first purge port 79. First and second valve stems 71 and 72 remain in the purge and supply positions, respectively, until the pneumatic controller unit switches after the predetermined amount of time back to the first phase of operation.

Preferably, the pneumatic controller unit is an electronic control unit having a timer component so that the electronic control unit automatically and alternately opens and closes the first and second solenoid valves every predetermined time period. Pressure is thus supplied to and exhausted from chambers 11 and 12 so that valve stems 71 and 72 switch back and forth between the supply and purge positions on an alternating basis.

The check valve mechanism 8 of the twin tower system 1 also includes a ball check device 39 situated within output passage 34. When the twin tower system 1 opens the drain valve of the separating means 2, the air pressure then contained within the twin tower system 1 expels through the drain valve carrying therewith to atmosphere fluid and particulate matter accumulated in the separating means 2. This causes ball check device 39 to seat forcibly against the terminal end 38 of output passage 34 thereby preventing clean and dried air that has already passed to the pneumatic system from flowing into the twin tower system 1 and eventually to atmosphere. Ball check device 39 thus maintains air pressure within the pneumatic system when the drain valve is opened. When the twin tower system 1 closes the drain valve, ball check device 39 allows flow of purified air from the twin tower system 1 through output passage 34 to the pneumatic system.

The switching and purging means 7 of the twin tower system 1 may optionally be equipped with two purge exhaust silencers (not shown). A first purge exhaust silencer may be employed to reduce noise associated with the purging of remoisturized air from first purge port 79. Likewise, a second purge exhaust silencer may be employed to reduce noise associated with the purging of remoisturized air from second purge port 80.

One noteworthy point apparent from the aforedescribed operation of the twin tower air drying system 1 relates to the function of switching and purging means 7 therein. The switching and purging means 7 not only directly controls the direction of flow of the stream of unpurified air through the twin tower system 1 but also ultimately determines the direction of w of the first and second streams of purified air through check valve means 8. Accordingly, check valve means 8 and switching and purging means 7 can be collectively referred to as a means for controlling the flow of both the unpurified air stream and the purified air streams through the twin tower system 1.

A further noteworthy point relates to the operation of check valve means 8 within the twin tower system 1. The purge percentage corresponds to the size of the purge orifice 42 of the shuttle choke 41 of check valve means 8. This determines the amount of the first and second streams of purified air directed through the purge orifice 42 to purge moisture alternately from second tower 6 and second coalescing element 4 in the first operational phase and from first tower 5 and first coalescing element 3 in the second operational phase, respectively. The purge and output percentages are preferably ten (10%) and ninety (90%) percent, respectively.

The twin tower system 1 also includes a heating element for the drain valve. During cold temperature operation, the drain valve is heated to prevent freezing of the fluid and of the other particulates collected within the sump. This prevents clogging of the drain valve. The twin tower system 1 may optionally include a drain exhaust silencer to reduce noise associated with operation of the drain valve.

Another noteworthy matter pertains to the placement of the various electronic control components of the twin tower system 1. These are preferably housed in a single enclosure. The pneumatic controller unit of the switching and purging means 7 as well as an electronic heater element control unit may be housed in this single enclosure along with other electronic components such as the control for the drain valve.

Refer now to a second embodiment of the present invention which FIG. 4 likewise illustrates. The switching and purging mechanism 7 is essentially a dual valve mechanism. The dual valve mechanism 7 may be used in a variety of suitable systems whose operation depends upon such a mechanism to control the flow of fluids therein. In this second embodiment, dual valve mechanism 7 includes the same components and features as those included within switching and purging mechanism 7 described above. First and second purge ports 79 and 80, however, are used herein as a third and a fourth supply passage 79 and 80, respectively. First output port 77 is used as an output from which fluid flows alternately from first and third supply passages 75 and 79. Likewise, second output port 78 is used as an output from which fluid flows alternately from second and fourth supply passages 76 and 80. A fluid controller unit subsumes the role of the pneumatic controller unit.

Piston bores 73 and 74, first and second supply passages 75 and 76, third and fourth supply passages 79 and 80, and output ports 77 and 78 and relate structurally as described in the presently preferred embodiment. The supply passages, however, may be arranged to receive fluid from different sources. For example, in this second embodiment, first supply passage 75 receives a first stream of fluid. Second supply passage 76 receives a second stream of fluid. Third supply passage 79 receives a third stream of fluid and fourth supply passage 80 receives a fourth of stream of fluid.

When first valve stem 71 seats against first lower valve seat 81b, first valve stem 71 occupies a primary flow position in which the first stream of fluid flows from first supply passage 75 through first piston bore 73 through first output port 77. Communication between third supply passage 79 and first output port 77 ceases. When first valve stem 71 seats against first upper valve seat 85, first valve stem 71 occupies a secondary flow position in which the third stream of fluid flows from third supply passage 79 through first piston bore 73 through first output port 77. Communication between first supply passage 75 and first output port 77 ceases. Likewise, when second valve stem 72 seats against second lower valve seat 82b, second valve stem 72 occupies a primary flow position in which the second stream of fluid flows from second supply passage 76 through second piston bore 74 through second output port 78. Communication between fourth supply passage 80 and second output port 78 ceases. When second valve stem 72 seats against second upper valve seat 86, second valve stem 72 occupies a secondary flow position in which the fourth stream of fluid flows from fourth supply passage 80 through second piston bore 74 through second output port 78. Communication between second supply passage 76 and second output port 78 ceases. The valve control means of the dual valve mechanism 7 controls the switching of first and second valve stems 71 and 72 periodically between the primary and secondary flow positions.

As with the previous embodiment, the valve control means of the dual valve mechanism 7 also includes first and second diaphragm piston members 91 and 92, first and second biasing springs 93 and 94, first and second solenoid valves (not shown) and the fluid controller unit (not shown). Through the fluid controller, the valve stem control means may be used to switch first and second valve stems 71 and 72 alternately between the primary and secondary flow positions so that while one of valve stems occupies one of the flow positions for a predetermined time another of the valve stems occupies another of the flow positions for the predetermined time. Through adjustment of the fluid controller unit, the valve stem control means may also be used to switch first and second valve stems 71 and 72 between the primary and secondary flow positions so that both occupy the same flow position simultaneously for the predetermined time.

It should be apparent that dual valve mechanism 7 may be adapted for use in a variety of suitable systems. For example, first and second supply passages 75 and 76 may be connected to one common source and third and fourth supply passages 79 and 80 may be connected to another common source. Various other modifications may be employed to alter the function of the dual valve mechanism 7 to suit the needs of a given system.

While the presently preferred and second embodiments for carrying out the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for a time prescribed by the Patent Act.

We claim:

1. A switching and purging mechanism for controlling flow of gas within a twin tower gas drying system having two drying assemblies, such twin tower gas drying system for cleaning and drying a stream of unpurified pressurized gas received from a source thereof and for supplying such purified gas to a pneumatic system with a purge percentage of such purified gas for purging alternately from each such drying assembly moisture previously retained via remoisturization of such purified gas, said switching and purging mechanism comprising:

(a) a valve body defining a first and a second piston bore, a first and a second supply passage, a first and a second output port, and a first and a second purge port such that
      (i) said first and said second supply passage each connect to such source of unpurified gas,
      (ii) said first supply passage is communicable with said first output port through said first piston bore, and said second supply passage is communicable with said second output port through said second piston bore, and
      (iii) said first purge port is communicable with said first output port through said first piston bore, and said second purge port is communicable with said second output port through said second piston bore;
   (b) a first valve cup concentrically disposed and affixed within said first piston bore;
   (c) a second valve cup concentrically disposed and affixed within said second piston bore;
   (d) a first valve stem disposed within said first valve cup for reciprocal movement within said first piston bore from a first upper valve seat of said valve body to a first lower valve seat of said first valve cup such that
      (i) when said first valve stem seats against said first lower valve seat, said first valve stem occupies a supply position in which such unpurified gas flows from said first supply passage through said first piston bore through said first output port and communication between said first output port and said first purge port ceases, and
      (ii) when said first valve stem seats against said first upper valve seat, said first valve stem occupies a purge position in which such remoisturized gas flows from said first output port through said first piston bore through said first purge port and communication between said first supply passage and said first output port ceases;
   (e) a second valve stem disposed within said second valve cup for reciprocal movement within said second piston bore from a second upper valve seat of said valve body to a second lower valve seat of said second valve cup such that
      (i) when said second valve stem seats against said second lower valve seat, said second valve stem occupies said supply position in which such unpurified gas flows from said second supply passage through said second piston bore through said second output port and communication between said second output port and said second purge port ceases, and
      (ii) when said second valve stem seats against said second upper valve seat, said second valve stem occupies said purge position in which such remoisturized gas flows from said second output port through said second piston bore through said second purge port and communication between said second supply passage and said second output port ceases; and
   (f) a valve stem control means for switching said first and said second valve stems alternately between said supply and said purge positions so that while one of said valve stems occupies one of said positions for a predetermined time another of said valve stems occupies another of said positions for said predetermined time.

2. The switching and purging mechanism as recited in claim 1 wherein said valve stem control means includes:

(a) a first diaphragm piston member attached to said first valve stem;
   (b) a second diaphragm piston member attached to said second valve stem;
   (c) a first spring for biasing said first valve stem to one of said positions;
   (d) a second spring for biasing said second valve stem to one of said positions;
   (e) a first solenoid valve though which pressure is supplied and exhausted for reciprocating via said first diaphragm piston member said first valve stem between said supply and said purge positions;
   (f) a second solenoid valve through which pressure is supplied and exhausted for reciprocating via said second diaphragm piston member said second valve stem between said supply and said purge positions; and
   (g) a pneumatic controller unit for controlling operation of said solenoid valves so that pressure is supplied to and exhausted from said diaphragm piston members such that said valve stems are switched alternately between said supply and said purge positions every said predetermined time.

3. The switching and purging mechanism as recited in claim 2 wherein:

(i) each of said diaphragm piston members has a base portion and a narrowed section arising therefrom for affixation to one of said valve stems so that said base portion has a bottom surface and an annular top surface; and
   (ii) each of said valve cups has an annular portion having an upper surface as said lower valve seat and an annular lower surface;

so that said first biasing spring situates between said annular lower surface of said first valve cup and said annular top surface of said base portion of said first diaphragm piston member and so that said second biasing spring situates between said annular lower surface of said second valve cup and said annular top surface of said base portion of said second diaphragm piston member.

4. The switching and purging mechanism as recited in claim 1 further including:
   (a) a first lower valve seat o-ring for sealing said first valve stem against said first lower valve seat when said first valve stem occupies said supply position;
   (b) a first upper valve seat o-ring for sealing said first valve stem against said first upper valve seat when said first valve stem occupies said purge position;
   (c) a second lower valve seat o-ring for sealing said second valve stem against said second lower valve seat when said second valve stem occupies said supply position; and
   (d) a second upper valve seat o-ring for sealing said second valve stem against said second upper valve seat when said second valve stem occupies said purge position.

5. The switching and purging mechanism as recited in claim 1 further including:
   (a) a first purge exhaust silencer for reducing noise associated with flow of such remoisturized gas from said first purge port; and
   (b) a second purge exhaust silencer for reducing noise associated with flow of such remoisturized gas from said second purge port.

6. A switching and purging mechanism for controlling flow of gas within a twin tower gas drying system having two drying assemblies, such twin tower gas drying system for cleaning and drying a stream of unpurified pressurized gas received from a source thereof and for supplying such purified gas to a pneumatic system with a purge percentage of such purified gas for purging alternately from each such drying assembly moisture previously retained via remoisturization of such purified gas, said switching and purging mechanism comprising:
   (a) a valve body defining a first and a second piston bore, a first and a second supply passage, a first and a second output port, and a first and a second purge port such that
      (i) said first and said second supply passage each connect to such source of unpurified gas,
      (ii) said first supply passage is communicable with said first output port through said first piston bore, and said second supply passage is communicable with said second output port through said second piston bore, and
      (iii) said first purge port is communicable with said first output port through said first piston bore, and said second purge port is communicable with said second output port through said second piston bore;
   (b) a first and a second piston valve means each of which for alternating reciprocal movement within said first and said second piston bores, respectively, such that
      (i) said first piston valve means is movable between a supply position in which such unpurified gas flows from said first supply passage through said first piston bore through said first output port and communication between said first output port and said first purge port ceases and a purge position in which such remoisturized gas flows from said first output port through said first piston bore through said first purge port and communication between said first supply passage and said first output port closes, and
      (ii) said second piston valve means is movable between said purge position in which such remoisturized gas flows from said second output port through said second piston bore through said second purge port and communication between said second supply passage and said second output port ceases and said supply position in which such unpurified gas flows from said second supply passage through said second piston bore through said second output port and communication between said second output port and said second purge port closes; and
   (c) a piston control means for switching periodically said first and said second piston valve means alternately between said supply and said purge positions.

7. The switching and purging mechanism as recited in claim 6 wherein said piston control means switches said first and said second piston valve means alternately between said supply and said purge positions so that while one of said piston valve means occupies one of said positions for a predetermined time another of said piston valve means occupies another of said positions for said predetermined time.

8. The switching and purging mechanism as recited in claim 7 wherein:
   (a) said first piston valve means includes a first valve stem disposed within a first valve cup concentrically disposed and affixed within said first piston bore, said first valve stem for reciprocal movement within said first valve cup from a first upper valve seat of said valve body to a first lower valve seat of said first valve cup so that
      (i) when said first valve stem seats against said first lower valve seat, said first valve stem occupies said supply position, and
      (ii) when said first valve stem seats against said first upper valve seat, said first valve stem occupies said purge position;
   (b) said second piston valve means includes a second valve stem disposed within a second valve cup concentrically disposed and affixed within said second piston bore, said second valve stem for reciprocal movement within said second valve cup from a second upper valve seat of said valve body to a second lower valve seat of said second valve cup so that
      (i) when said second valve stem seats against said second lower valve seat, said second valve stem occupies said supply position, and
      (ii) when said second valve stem seats against said second upper valve seat, said second valve stem occupies said purge position; and
   (c) said piston control means includes a first diaphragm piston member attached to said first valve stem, a second diaphragm piston member attached to said second valve stem, a first spring for biasing said first valve stem to one of said positions, a second spring for biasing said second valve stem to one of said positions, a first solenoid valve though which pressure is supplied and exhausted for reciprocating via said diaphragm piston member said first valve stem between said supply and said purge positions, a second solenoid valve through which pressure is supplied and exhausted for reciprocating via said second diaphragm piston member said second valve stem between said supply and said purge positions, and a pneumatic controller unit for controlling operation of said solenoid valves so that pressure is supplied to and exhausted from said diaphragm piston members such that said valve stems are switched alternately between said supply and said purge positions every said predetermined time.

9. The switching and purging mechanism as recited in claim 8 wherein:
   (i) each of said diaphragm piston members has a base portion and a narrowed section arising therefrom for affixation to one of said valve stems so that said base portion has a bottom surface and an annular top surface; and (ii) each of said valve cups has portion having an upper surface as said lower valve seat and an annular lower surface;

so that said first biasing spring situates between said annular lower surface of said first valve cup and said annular top surface of said base portion of said first diaphragm piston member and so that said second biasing spring situates between said annular lower surface of said second valve cup and said annular top surface of said base portion of said second diaphragm piston member.

10. The switching and purging mechanism as recited in claim 8 further including:

(a) a first lower valve seat o-ring for sealing said first valve stem against said first lower valve seat when said first valve stem occupies said supply position;

(b) a first upper valve seat o-ring for sealing said first valve stem against said first upper valve seat when said first valve stem occupies said purge position;

(c) a second lower valve seat o-ring for sealing said second valve stem against said second lower valve seat when said second valve stem occupies said supply position; and (d) a second upper valve seat o-ring for sealing said second valve stem against said second upper valve seat when said second valve stem occupies said purge position.

11. The switching and purging mechanism as recited in claim 6 further including:

(a) a first purge exhaust silencer for reducing noise associated with flow of such remoisturized gas from said first purge port; and (b) a second purge exhaust silencer for reducing noise associated with flow of such remoisturized gas from said second purge port.

12. A dual valve mechanism for controlling flow of four streams of fluid within a system, said dual valve mechanism comprising:

(a) a valve body defining a first and a second piston bore, a first and a second supply passage, a first and a second output port, and a third and a fourth supply passage such that (i) said first supply passage for receiving a first of such streams of fluid from a source thereof, (ii) said second supply passage for receiving a second of such streams of fluid from a source thereof, (iii) said third supply passage for receiving a third of such streams of fluid from a source thereof, (iv) said fourth supply passage for receiving a fourth of such streams of fluid from a source thereof, (v) said first supply passage is communicable with said first output port through said first piston bore, and said second supply passage is communicable with said second output port through said second piston bore, and (vi) said third supply passage is communicable with said first output port through said first piston bore, and said fourth supply passage is communicable with said second output port through said second piston bore;

(b) a first valve cup concentrically disposed and affixed within said first piston bore;

(c) a second valve cup concentrically disposed and affixed within said second piston bore;

(d) a first valve stem disposed within said first valve cup for reciprocal movement within said first piston bore from a first upper valve seat of said valve body to a first lower valve seat of said first valve cup such that (i) when said first valve stem seats against said first lower valve seat, said first valve stem occupies a primary flow position in which such first stream of fluid flows from said first supply passage through said first piston bore through said first output port and communication between said third supply passage and said first output port ceases, and (ii) when said first valve stem seats against said first upper valve seat, said first valve stem occupies a secondary flow position in which such third stream of fluid flows from said third supply passage through said first piston bore through said first output port and communication between said first supply passage and said first output port ceases;

(e) a second valve stem disposed within said second valve cup for reciprocal movement within said second piston bore from a second upper valve seat of said valve body to a second lower valve seat of said second valve cup such that (i) when said second valve stem seats against said second lower valve seat, said second valve stem occupies said primary flow position in which such second stream of fluid flows from said second supply passage through said second piston bore through said second output port and communication between said fourth supply passage and said second output port ceases, and (ii) when said second valve stem seats against said second upper valve seat, said second valve stem occupies said secondary flow position in which such fourth stream of fluid flows from said fourth supply passage through said second piston bore through said second output port and communication between said second supply passage and said second output port ceases; and (f) a valve stem control means for switching said first and said second valve stems periodically between said primary and said secondary flow positions.

13. The dual valve mechanism as recited in claim 12 wherein said valve stem control means includes:

(a) a first diaphragm piston member attached to said first valve stem;

(b) a second diaphragm piston member attached to said second valve stem;

(c) a first spring for biasing said first valve stem to one of said flow positions;

(d) a second spring for biasing said second valve stem to one of said flow positions;

(e) a first solenoid valve though which pressure is supplied and exhausted for reciprocating via said first diaphragm piston member said first valve stem between said primary and said secondary flow positions;

(f) a second solenoid valve through which pressure is supplied and exhausted for reciprocating via said second diaphragm piston member said second valve stem between said primary and said secondary flow positions; and (g) a fluid controller unit for controlling operation of said solenoid valves so that pressure is supplied to and exhausted from said diaphragm piston members such that said valve stems are switched periodically between said primary and said secondary flow positions.

14. The dual valve mechanism as recited in claim 13 wherein:

(i) each of said diaphragm piston members has a base portion and a narrowed section arising therefrom for affixation to one of said valve stems so that said base portion has a bottom surface and an annular top surface; and (ii) each of said valve cups has an annular portion having an upper surface as said lower valve seat and an annular lower surface;

so that said first biasing spring situates between said annular lower surface of said first valve cup and said annular top surface of said base portion of said first diaphragm piston member and so that said second biasing spring situates between said annular lower surface of said second valve cup and said annular top surface of said base portion of said second diaphragm piston member.

15. The dual valve assembly mechanism as recited in claim 12 wherein said valve stem control means switches said first and said second valve stems alternately between said primary and said secondary flow positions so that while one of said valve stems occupies one of said flow positions for a predetermined time another of said valve stems occupies another of said flow positions for said predetermined time.

16. The dual valve assembly mechanism as recited in claim 12 wherein said valve stem control means switches said first and said second valve stems between said primary and said secondary flow positions so that both of said valve stems occupy a same of said flow positions simultaneously for a predetermined time.

17. The dual valve assembly mechanism as recited in claim 12 wherein such sources of such first and such second streams of fluid are common thus making such first and such second streams of fluid identical and such sources of such third and such fourth streams of fluid are common thus making such third and such fourth streams of fluid identical.

* * * * *

UNITED STATES PATENT AND TRADEMARK OFFICE
CERTIFICATE OF CORRECTION

PATENT NO. : 5,604,991
DATED : February 25, 1997
INVENTOR(S) : T, Kevin Castle, et al.

It is certified that error appears in the above-identified patent and that said Letters Patent is hereby corrected as shown below:

Column 1, line 27, please delete "of" (third occurrence), and insert --to--.
Column 4, line 9, after "and", please insert --the--.
Column 5, line 31, after "with", please insert --the--.
Column 11, line 27, please delete "w" and insert --flow--.
Column 14, line 36, please delete "though" and insert --through--.
Column 16, line 51, please delete "though" and insert --through--.
Column 17, line 4, after "has", please insert --an annular--.
Column 18, line 54, please delete "though" and insert --through--.

Signed and Sealed this

Twenty-third Day of June, 1998

Attest:

BRUCE LEHMAN

Attesting Officer

Commissioner of Patents and Trademarks